United States Patent Office 3,843,345
Patented Oct. 22, 1974

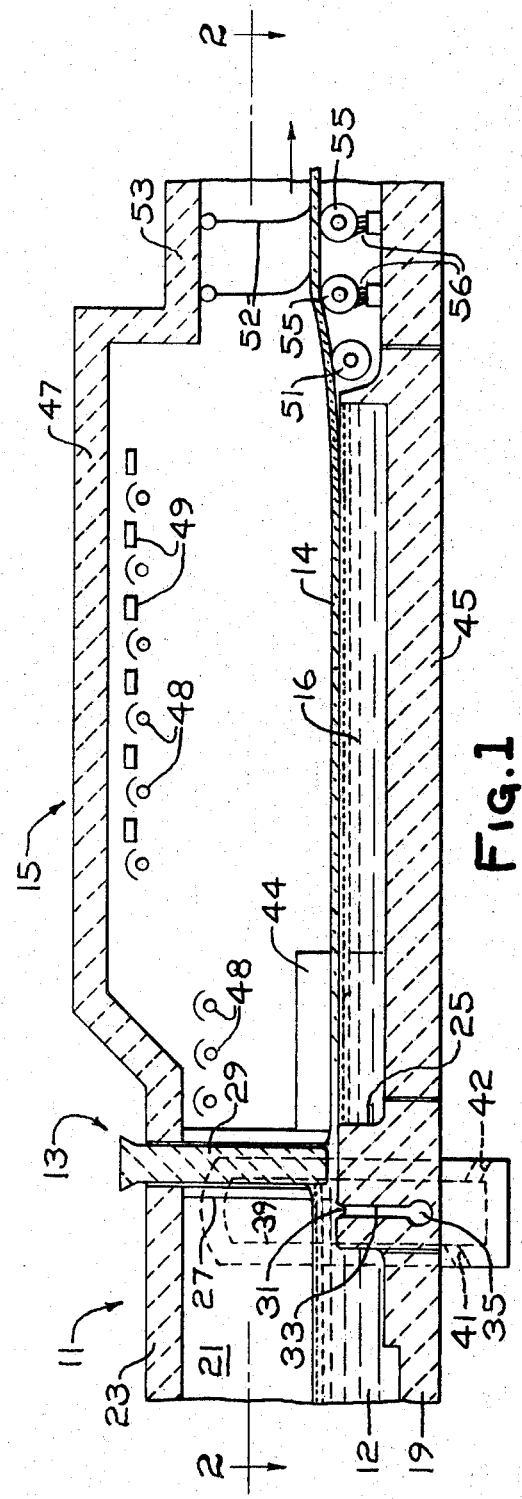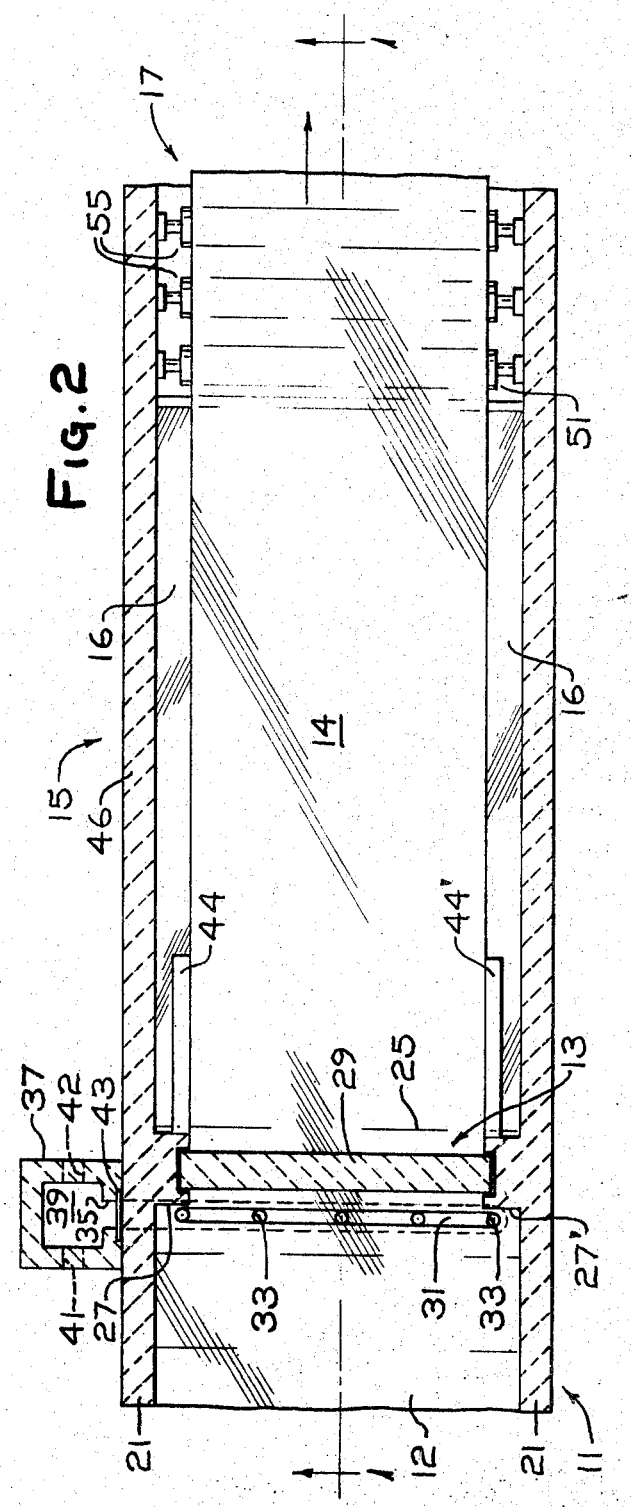

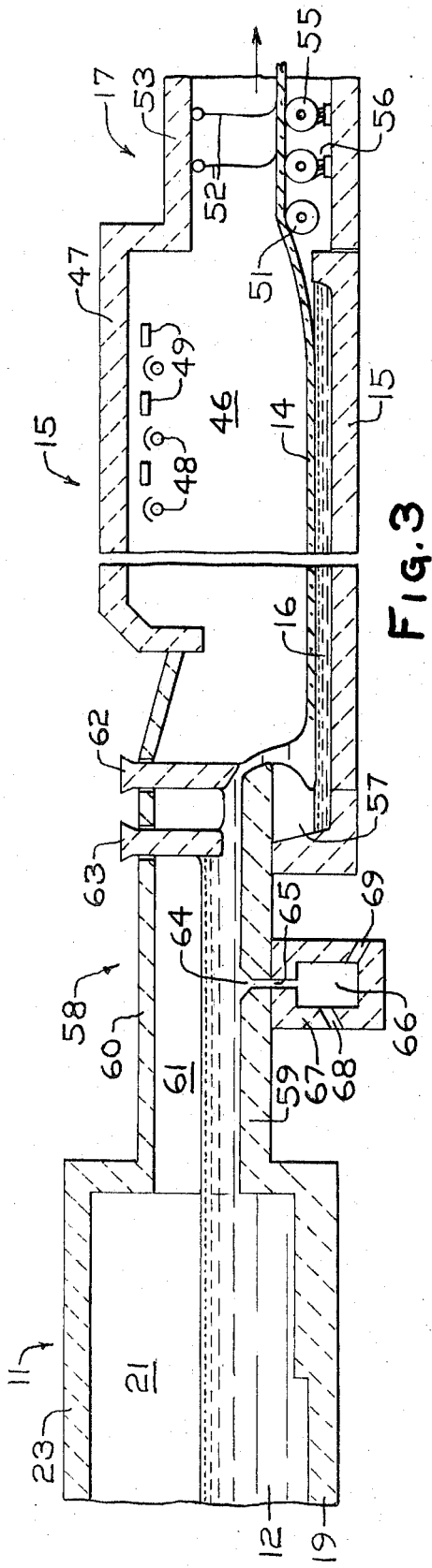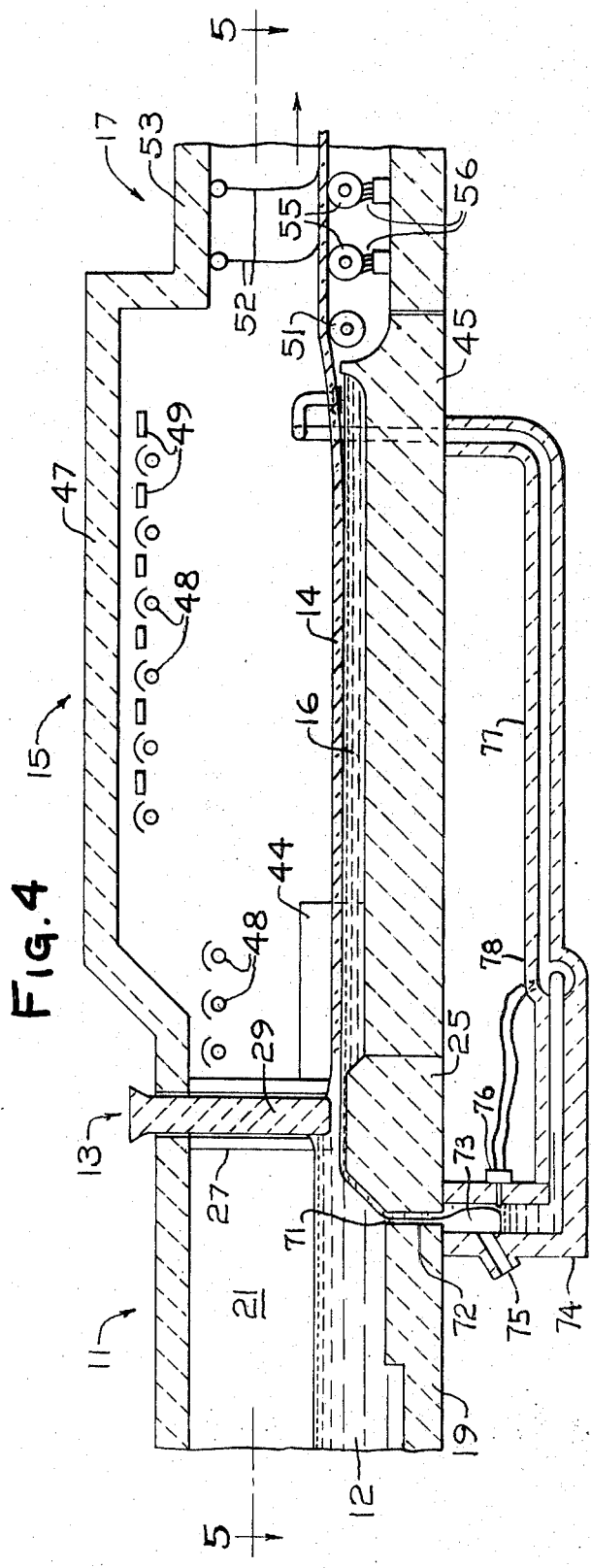

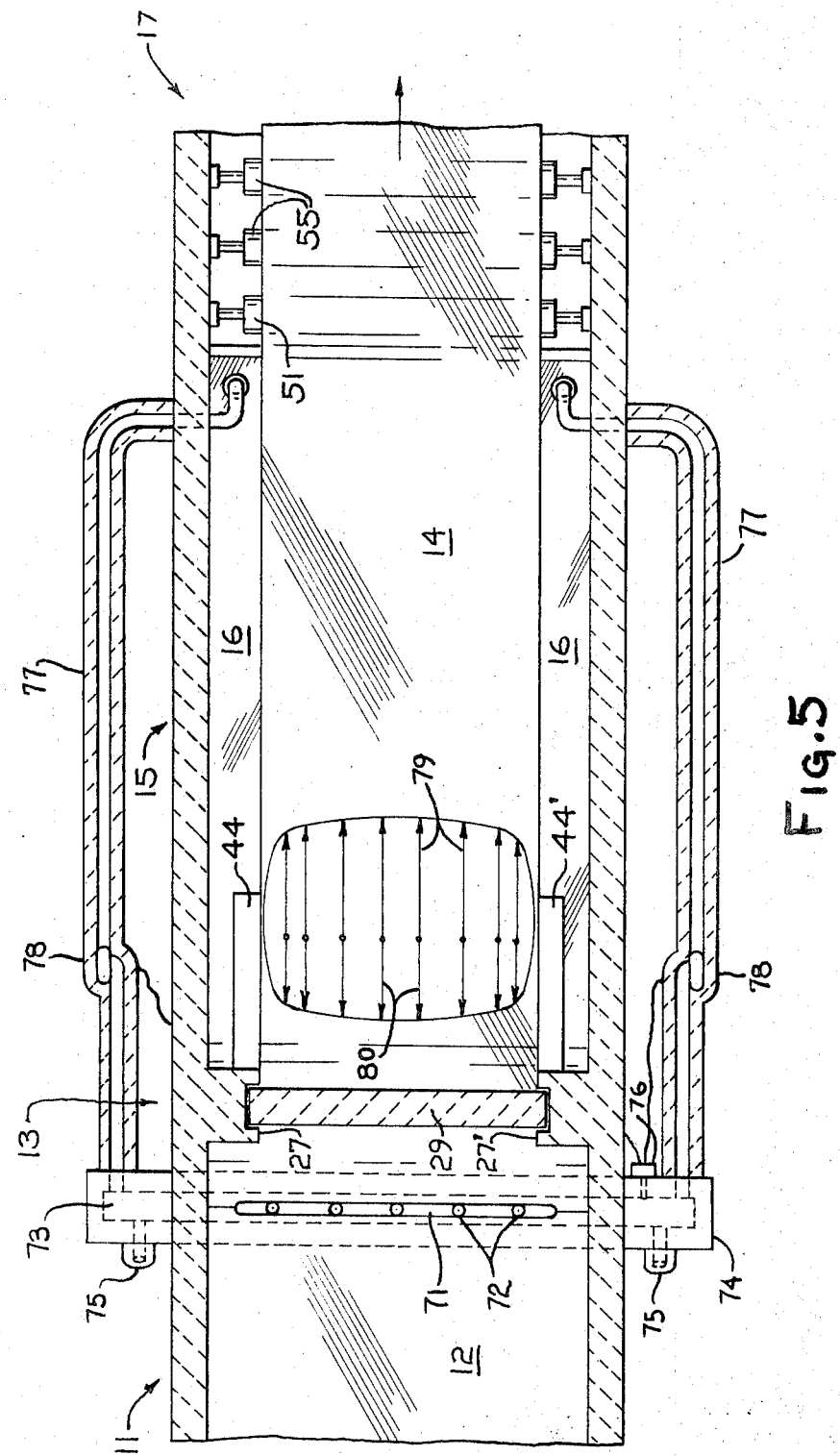

3,843,345
METHOD AND APPARATUS FOR DELIVERY OF MOLTEN GLASS TO A FLOAT FORMING PROCESS
William C. Harrell, Sarver, and Homer R. Foster, Kittanning, Pa., assignors to PPG Industries, Inc., Pittsburgh, Pa.
Filed Mar. 6, 1973, Ser. No. 338,496
Int. Cl. C03b 18/02
U.S. Cl. 65—65 A                              14 Claims

ABSTRACT OF THE DISCLOSURE

Flat glass having superior optical quality and having surfaces substantially free of defects is continuously produced by discharging a stream of glass onto a pool of molten metal and drawing this stream of glass into a dimensionally stable ribbon of glass while cooling it. A portion of glass in contact with refractory material during the melting and refining of the glass is separated from the main body of glass and removed prior to delivery of the stream of molten glass onto the molten metal.

CROSS REFERENCE TO RELATED APPLICATIONS

This application is related to the following commonly assigned applications, all of which were filed on Mar. 6, 1973 and all of which are specifically incorporated by reference herein: "Manufacture of Glass by Contiguous Float Process," Ser. No. 338,497, to Charles K. Edge and Gerald E. Kunkle; "Manufacture of Thin Glass," Ser. No. 338,474, to Thomas R. Trevarrow and Kenneth R. Graff; and "Manufacture of Glass," Ser. No. 338,475, to William F. Galey.

BACKGROUND OF THE INVENTION

Field of the Invention

This invention relates to the manufacture of a continuous sheet of flat glass by floating molten glass on a pool of molten metal while attenuating and cooling the glass. More particularly, this invention relates to a method and apparatus for manufacturing glass sheets of improved optical quality and diminished surface defects when compared with the conventional manufacture of glass by a float process.

Description of the Prior Art

It has been proposed heretofore to form a continuous sheet of glass by depositing molten glass onto a bath of molten metal having a density greater than the density of the glass and drawing the glass along the molten metal while cooling it and attenuating it to form a dimensionally stable ribbon or continuous sheet of glass, which may then be withdrawn from the bath for further processing. Early developments, such as those of Heal, U.S. Pat. No. 710,357, and of Hitchcock, U.S. Pat. No. 789,911, disclose the manufacture of flat glass by continuously feeding molten glass onto a pool of molten metal to form a ribbon of glass which is cooled and drawn along the molten metal to form a finished ribbon of glass.

Glass produced according to these methods has been found to exhibit substantial optical distortion, as reported by Pilkington in the file histories of the patents described below (Paper No. 5, pages 7 and 8, of U.S. Pat. No. 3,220,816). Optical distortion of a gross nature has thus been attributed in the art to a failure to break up the bottom surfaces of a discharge stream of glass. The contact between glass and refractory in the discharge of glass onto a float bath has been found to result in imperfections both in the body of the glass and in the surface of the glass. The float glass manufacturing processes which are now commonly practiced are embraced within the teachings of U.S. Pats. Nos. 3,083,551 and 3,220,816. These patents teach pouring molten glass onto molten metal in a manner such that the glass is allowed to freely fall onto the molten metal. The molten glass then separates into a rearwardly flowing stream and a forwardly flowing stream. According to these patents, the rearwardly flowing stream is comprised of glass which had been in contact with a refractory discharge member and has been contaminated by such contact. This portion of glass is believed to spread outwardly into the marginal portions of the finished ribbon, where it may be conveniently removed from the finished ribbon.

In recent years, as optical quality standards have become more stringent, glass made by the present processes has been only marginally satisfactory for certain end uses. Optical distortion observed in glass manufactured by these processes has been found to be caused by this free fall of molten glass. Nevertheless, because of refractory contamination, it has been necessary to tolerate the optical distortions caused by free fall in order to clear the major portion of the glass surface of such contamination.

One particularly bothersome problem which has been encountered in the manufacture of flat glass by the float process has been the difficulty in establishing uniform transverse temperature distributions in a molten glass layer once it is established on the molten metal. There is a pronounced tendency for the marginal portions of the glass to be substantially colder than the central portion of the glass and for the temperature across the glass to increase from the margins to the center in a pronounced parabolic shape. Because of the visco-elastic nature of glass and because of the longitudinal attenuation forces applied to the glass during forming, the establishment of this parabolic temperature profile has been blamed for optical distortion in the glass, believed to be caused by unbalanced shear forces within the body of glass. Previous attempts to control the lateral temperature distribution in the glass have been confined to techniques which impose heat transfer only at discrete locations along the path of glass flow, and so have been ineffective to counteract this problem. Representative of the techniques for temperature control are the use of coolers and radiant heaters disposed remotely from the glass and the use of electromagnetic induction motors to establish convection within the molten metal, such as disclosed in U.S. Pat. No. 3,479,171.

The present invention is directed to a method and apparatus for manufacturing flat glass which are effective to overcome the problems of the present manufacturing techniques described above.

SUMMARY OF THE INVENTION

The present invention comprises delivering molten glass from a glass furnace comprising a melting zone and a refining zone onto a pool of molten metal after separating a portion of molten glass from the main body of delivered molten glass and then cooling and attenuating the portion delivered onto the molten metal to form a ribbon of glass. In a simple embodiment of this invention, molten glass is fed from a pool of molten glass in a refiner or conditioner into a canal, trough or other delivery means. Within the delivery means, the molten glass flowing therethrough is separated into two portions. The first portion, including substantially all of the glass which had been in contact with the floor or support for the glass within the delivery means is withdrawn from the delivery means and may be discarded or recycled into the glass melting furnace. The second portion of molten glass, containing substantially no glass which had been in contact with the supporting means for the molten glass being delivered, is discharged onto the pool of molten metal to form a sheet of glass by being cooled and attenuated thereon. While the second portion of glass, which ultimately forms the ribbon, may be delivered onto the molten metal by free fall as in conventional float glass manufacture, it is preferably delivered with substantially unidirectional, horizontal flow onto the molten metal bath so that optical distortion will not be developed within the glass.

In another embodiment of this invention, molten metal is caused to flow countercurrently to the flow of molten glass and movement of the ribbon formed therefrom on the molten metal. This flowing molten metal meets with the portion of molten glass adjacent the support for the molten glass being delivered to the molten metal and is removed, preferably along with the removed portion of molten glass, for recycling into the main body of molten metal. This embodiment of the present invention has the particular utility of establishing uniform transverse temperatures within the glass ribbon as it is formed, for the molten metal has a transverse velocity profile which is substantially parabolic in nature with the velocity greatest along its centerline so that the heat transfer between the molten glass and molten metal is preferentially enhanced along the centerline of the glass ribbon as it is being formed. In this embodiment, the molten metal flowing countercurrent to the glass movement and the portion of glass being removed from the process may meet at the entrance of a transverse bottom drain within the delivery means or threshold between the glass furnace and the float forming bath. The molten metal and molten glass flowing together through the transverse drain may be delivered to a heated chamber. Within that chamber, the glass floats on the molten metal and may be easily separated for discard or recycle into the melting zone of the glass furnace. The molten metal in the chamber is recycled to the float forming bath either by a pump suitable for pumping molten metal or by employing a plurality of such chambers and permitting a chamber to cool occasionally to solidify the metal such that it may be removed from the chamber and carried back to the forming chamber.

It is also possible in the practice of this invention to cause molten metal to continuously flow over a weir at the downstream end of the chamber so that the continuous sheet of glass may be withdrawn without lifting it. In such an arrangement the overflowing metal is returned to the pool of molten metal in a manner similar to that employed for returning molten metal from the upstream end of the chamber.

The present invention will be further understood from the drawings and descriptions which follow.

BRIEF DESCRIPTION OF THE DRAWINGS

FIG. 1 is a longitudinal sectional view of an apparatus for making glass in accordance with the present invention;

FIG. 2 is a horizontal sectional view taken along line 2—2 of FIG. 1;

FIG. 3 is a longitudinal sectional view of alternate apparatus for producing glass in accordance with the present invention;

FIG. 4 is a longitudinal sectional view of an apparatus for making glass according to the particular embodiment of the present invention which provides for the countercurrent flow of molten metal; and FIG. 5 is a horizontal schematic sectional view taken along line 5—5 of FIG. 4 showing the countercurrent velocity profiles established within the glass and molten metal when practicing one embodiment of this invention.

DESCRIPTION OF THE PREFERRED EMBODIMENTS

With particular reference to the drawings and especially to FIGS. 1 and 2 there is shown an apparatus for producing glass according to the method of this invention. A glass furnace terminating in a refining and conditioning zone 11 contains molten glass 12. This molten glass conditioner 11 is connected to a discharge means 13 through which molten glass 12 flows in a controlled manner to be formed into a ribbon of glass 14 in a forming chamber 15. The forming chamber has within it a pool of molten metal 16 having a density greater than the density of the glass 12. With the upper surface of the molten metal adjusted to a level such that glass 12 may flow without falling freely onto the molten metal 16. During the movement of the glass downstream through the forming chamber 15 the glass is cooled to cause it to change from molten glass 12 to a dimensionally stable ribbon of glass 14 having its thickness defined by the extent to which the molten glass is attenuated while being cooled. The glass ribbon is drawn along the surface of the molten metal 16 through the forming chamber 15 to means 17 for lifting it from the forming chamber.

The molten glass conditioner 11 comprises a refractory floor 19, sidewalls 21 and a roof 23. In the preferred embodiments of this invention the bottom floor 19 of the conditioner or refiner is stepped so that the depth of molten glass in the conditioner is less near its discharge end than at locations farther upstream within the conditioner. The molten glass conditioner is constructed and operated so that glass passing through it toward the discharge means is gradually cooled and allowed to lose gaseous and volatile impurities. The molten glass 12 is cooled to a temperature at which it is still flowable but such that with some further cooling it may be formed into a dimensionally stable sheet of glass. For typical soda-lime-silica glasses the temperature of the molten glass in the glass conditioner closest to the discharge means is from about 1700° F. to 2200° F.

The discharge means 13 comprises a support for the molten glass. In the preferred embodiment the support is a threshold block 25. The discharge means also comprises side jambs 27 and 27' which define the sides of the channel through which molten glass may flow. The discharge means also comprises an adjustable metering means 29 extending downwardly into the molten glass. This metering means 29 is essentially a movable gate or tweel which may be adjusted upward or downward to control the size of the elongated horizontal opening formed by the threshold block 25, side jambs 27 and 27' and the tweel itself, 29. The bottom supporting member or threshold block of the discharge means in this invention is provided with means for draining glass comprising the bottom portion of the glass stream flowing through the discharge means away from the main stream of flow.

In the preferred embodiment of this invention shown in FIGS. 1 and 2, the drain means comprises an elongated transverse depression 31. The transverse depression 31 spans the width of the supporting member or threshold block 25. In communication with the transverse depression 31 are a series of drain holes 33. The drain holes 33 are connected to a common drain line 35 through which molten glass may flow to a drain doghouse 37. The drain doghouse 37 comprises a refractory enclosed cavity 39. Connected to the enclosed cavity 39 through the refractory walls of the drain doghouse 37 are doghouse drains 41 and 42. The doghouse drains 41 and 42 are positioned through the walls of the drain doghouse at different levels. The lower doghouse drain 42 provides for the separate draining of molten metal which may drain through drain holes 33 in the event the level of molten metal 16 rises above the upper surface of the threshold block 25. The drain doghouses are preferably maintained at a sufficiently high temperature so that glass within a drain doghouse remains in a molten state. Molten glass may be drained from the drain doghouse for example, through drain 41 and discharged into water in the same manner that molten glass is drained from a glass furnace when it is conventionally drained in preparation for repairs. Heat for maintaining the glass in its molten state may be supplied to the drains and the drain doghouse by electrical heating means. For example, resistance heating rods may be positioned on opposite sides of the drain 35 through tubular holes drilled transversely through the threshold block 25. It is preferred that the threshold block 25 be of a material such as fused silica so that localized heating may be accomplished without fear of damage to the block.

An alternative scheme for the ultimate removal of drain material is to provide a pair of drain doghouses each provided with a shut off 43 to stop the flow of drained material into the drain doghouse. The system may then be used to drain material, first to one side and then to the other, depending upon whether the material is to be returned to the furnace or discarded.

Moving downstream through the process, after the glass has been separated into two portions and one portion has been removed through the drain system, the remaining portion is discharged through the opening of the discharge means formed by the tweel 29 and the side jambs 27 and 27' and the threshold block 25. This portion of discharged molten glass is then delivered onto the surface of a bath of molten metal 16, preferably tin. This delivery may be substantially horizontal as shown in FIG. 1 or the threshold block may be downwardly sloped so that the glass flows downwardly onto the molten metal or the glass may fall onto the molten metal as shown in FIG. 3, which will be described in greater detail below.

The lateral dimension of the stream of molten glass flowing onto the molten metal which is first defined by the space between side jambs 27 and 27' is maintained by the spacing between guides or restraining members 44 and 44'. The restraining members 44 and 44' are substantially parallel guides comprising material which is preferably wet only to a limited extent by the molten glass. The guides or restraining members 44 and 44' may be provided with means for temperature control (not shown), such as means for heating and cooling them. In a preferred embodiment a longitudinal temperature gradient is established along the restraining member length so that there is relatively more wetting of each restraining member near the glass discharge means than there is wetting of the restraining member by glass at its downstream extremity.

The structure of forming chamber 15 comprises a bottom 45, side walls 46 and a roof 47. Mounted along the roof 47 are a series of heaters 48 and a series of coolers 49 which face the top surface of the floating, continuous ribbon of glass 14. These provide for the controlled heating or cooling of the glass 14 so that the glass may be attenuated and cooled to a dimensionally stable ribbon of desired width and thickness for removal from the forming chamber 15.

At the downstream end of the forming chamber 15 is a takeout means 17. At the end of the forming chamber is a takeout roll 51 disposed transversely across the path of glass movement. This roll supports the ribbon of glass 14 to lift it up from the molten metal bath 16. A series of barriers 52 enagage the upper surface of the ribbon of glass 14 to isolate the atmosphere in the forming chamber 15 above the surface of the glass from the downstream processing equipment. The barriers 52 preferably comprise flexible asbestos sheeting mounted on and depending from a roof member 53 extending from the roof 47 of the bath chamber 15.

The takeout means 17 comprises, in addition to the takeout roll 51 and barriers 52, a series of rolls 55 which support the glass and apply a longitudinal tractive force to the glass, drawing it from the forming chamber 15 and carrying it to further processing apparatus, such as an annealing lehr. Mounted in contact with the rollers 55 are a series of brushes 56 which also serve to isolate the forming chamber 15 from later processing apparatus.

In practicing the method of this invention sufficient tractive force is applied to the glass from rollers 55, as well as from downstream rollers (not shown) to unidirectionally attenuate the glass to its desired final thickness, particularly when its desired final thickness is less than equilibrium thickness.

As may be observed in FIG. 3 the principles of the present invention may be applied with advantage to an otherwise conventional molten glass delivery system of a conventional float process. While the preferred embodiments of this invention are those shown in FIGS. 1 and 2 and in FIGS. 4 and 5, the quality of glass produced by a conventional float forming process may be improved by utilizing a delivery system with the drain of this invention. Referring now to FIG. 3, the glass conditioner 11 and the glass forming chamber 15 and takeout means 17 are like those elements described for FIGS. 1 and 2, except that the glass forming chamber is constructed to permit the splitting of flow in a wet back area 57 and the chamber is not provided with restraining members 44 and, thus, the glass will spread unhindered to its equilibrium width. The embodiment of this invention shown in FIG. 3 comprises a canal 58 in place of the delivery means 13 shown in the other drawings. The canal 58 comprises a bottom 59 and a roof 60 as well as side walls 61. The canal 58 is distinguished from the delivery means 13 of the more preferred embodiments of this invention in a number of ways, one of which is that the spacing between the side walls 61 of the canal is much less than the spacing between the side jambs 27 and 27' of the preferred delivery means. In the canal the side walls 61 are spaced from each other a distance about 10 percent of the width of the conditioner 11, that is the spacing between walls 21, while the jambs 27 and 27' in a preferred delivery means are spacel from about 25 percent, and preferably from about 35 percent to 90 percent, of the width of the conditioner 11. The canal is provided with a metering tweel 62 and a shut off gate 63 both engaging the molten glass immediately before forming. The bottom of the canal 58 extends outwardly over the molten metal 16 within the bath chamber 15. As molten glass falls freely from the canal it separates into two portions, one flowing rearwardly and one, the main body, flowing forwardly as shown in FIG. 3.

Disposed transversely across the canal bottom 58 is a transverse depression 64. A series of drain holes 65 extending downwardly from depression 64 into a chamber 66 within a transverse drain doghouse 67 extending beneath the canal. Drains 68 and 69 are provided through the walls of the drain doghouse 67 so that glass drained into the doghouse may be continuously or intermittently removed as desired.

Another preferred embodiment of the present invention is shown in FIGS. 4 and 5. In this embodiment of the present invention a flow of molten metal is established countercurrent to the movement of glass. This countercurrent metal flow withdraws heat from the glass. By employing appropriate flow rates, more heat may be removed from the central portion of glass than from the marginal portions of the glass. This provides for a more uniform lateral distribution of temperature within the glass during its formation than is possible in conventional float glass manufacture. Therefore, the resulting product exhibits less optical distortion than does glass made by a conventional float forming process.

The molten glass conditioner 11, the forming chamber 15 and the takeout means 17 of this embodiment are essentially the same as shown and described for the first described embodiment shown in FIGS. 1 and 2. Exceptions are noted in the descriptions which follows.

The discharge delivery means 13 of this embodiment is different from that of the earlier described embodiment in that the upper surface of the supporting threshold block 25 is below the normal elevation of the surface of the molten metal 16 in the forming chamber.

In the embodiment of this invention shown in FIGS. 4 and 5, a transverse drain 71 is disposed across the bottom 19 of the conditioner 11 immediately upstream of the threshold block 25. Connected to the transverse drain 71 are several drain holes 72 which extend downwardly into a transverse collecting cavity 73. Molten metal and molten glass may be permitted to flow into the collecting cavity 73 during the manufacture of glass. The collecting cavity is defined by walls 74 through which drains 75 are constructed. The drains 75 are located above the bottom of the collecting cavity so that molten glass floating on top of molten metal in the collecting cavity may be removed from time to time.

The collecting cavity 73 is provided with a level detector-controller 76 which is used to maintain a sufficient level of molten metal in the cavity 73 to permit pumping therefrom. Insulated and heated conduits 77 are connected to the collecting cavity 73. These conduits 77 lead to the downstream end of the float forming chamber 15 and provides a means for recirculating molten metal to the pool of molten metal 16 in the chamber 15. Each conduit 77 is provided with pumping means 78 to force molten metal from the collecting cavity 73 back to the molten metal pool 16. These pumping means, which preferably are electromagnetic pumps, are connected to the level detector-controller 76, which controls their operation providing for the uniform flow of molten metal through the process.

The flows which are established in the glass and molten metal in the region between the guides 44 and 44' are illustrated schematically in FIG. 5. The glass flows in the general direction of glass movement. In the practice of this invention a relatively flat, transverse velocity profile is obtained as may be noted from the individual glass flow velocity vectors 79 shown. The molten metal velocity vectors 80 are opposite in direction and generally less in magnitude than the glass flow velocity vectors. The relative magnitudes of velocity vectors may be noted from FIG. 5 with the dots at the common tails of the velocity vectors indicating zero velocity. The relatively flat transverse velocity profile in the glass is in part due to glass-metal drag and in part due to relatively greater cooling in the central portion of the glass flow due to greater counter-current molten metal flow there. This improved flatness of velocity across the glass enhances the optical quality of glass produced by confining critical internal stresses in the glass to its edges during formation.

The practice of the present invention may be more fully appreciated with reference to the examples which follow.

EXAMPLE I

A glass furnace having a refiner or conditioner 360 inches wide is connected through a canal having a width of 40 inches and a length of 90 inches to a float forming bath with the exit of the canal spaced above the level of molten metal in the bath to provide for the free fall of molten glass onto the molten metal. The apparatus corresponds to that shown in FIG. 3, except that in this example a transverse drain slot is not provided. Instead, two drain holes, each about 2 inches in diameter, are present in the canal bottom closely adjacent the sidewalls of the canal just upstream from the tweel. Molten glass is delivered through the canal and onto the molten metal to form a ribbon of glass. The depth of the molten glass above the canal bottom in the vicinity of its drain holes is 12 inches. Sufficient glass is delivered to provide a total glass throughput of 400 tons per day. The temperature of the molten glass in the canal is maintained at 2028° F. A refractory tracer, such as cobalt glass, is distributed along the canal bottom at its entrance and across its entire width. The ribbon of glass produced is observed to have tracer material in its bottom surface throughout its width, despite the fact that some tracer material is found to be drained through the two holes. Glass from the canal is drained through the holes at a rate of 5.2 tons per day, which is 1.3 percent of the total throughput.

EXAMPLE II

The procedure of Example I is repeated, except that the canal temperature is controlled to 1995° F. The total amount of material drained off is about the same as in Example I, but the bottom surface of the resulting glass ribbon appears to be more severely contaminated with tracer than the ribbon in Example I.

EXAMPLE III

The procedure of Example I is repeated, except that the temperature of the molten glass within the canal is controlled to 2060° F. The rate of glass drained through the holes is about 16.5 tons per day, or about 3.3 percent of total throughput. The resulting ribbon of glass is contaminated with tracer along its bottom surface, particularly within the middle two-thirds of the glass, although the bottom surface along the margins appears to be less contaminated than in Example I.

EXAMPLE IV

The procedure of Example I is repeated, except that the apparatus in this example is provided with five 1.6 inch diameter drain holes in its canal bottom. One hole is along the centerline of the canal, and the holes are spaced 10 inches center to center. The apparatus is operated as in Examples I, II, and III to produce a glass ribbon at a rate of 400 tons per day. The depth of molten glass in the canal is 12 inches and the temperature of molten glass in the canal is maintained at 2020° F. The rate at which the molten glass is drained through the holes is found to be 10 tons per day, or 2.5 percent of total throughput. The bottom surface of the resulting ribbon is found to be contaminated with tracer in bands corresponding to the spacing between drain holes.

EXAMPLE V

The procedure and apparatus of Example IV were employed, except that the five drain holes were drilled out to a diameter of 2.2 inches at the surface of the canal bottom and the temperature of the molten glass in the canal is maintained at 2045° F. The resulting ribbon of glass is contaminated on its bottom surface as in Example IV, but the rate of molten glass removal is 16 tons per day, which is 4 percent of total throughput. In this example, the apparatus of Example IV is modified. The drain holes are connected by a shallow channel 1.25 inches deep and 2.5 inches in width. The shallow channel extends across the full 40-inch width of the canal bottom. The apparatus is operated to deliver 400 tons per day of glass, and the canal temperature is maintained at 2020° F. with the molten glass flowing through the canal having a depth of 12 inches. The rate of glass removal is 16 tons per day, or 4 percent of total throughput. The bottom surface of the glass ribbon is free of any tracer contamniation.

EXAMPLE VI

The procedure and apparatus of Example V are employed, with the same temperatures as in Example V maintained. However, the apparatus is operated to produce 500 tons per day of glass. The resulting ribbon of glass is found to have a bottom surface free of tracer contamination. The rate of molten glass removal through the drain is 12 tons per day, or 3 percent of total throughput.

As may be observed from the described examples, the apparatus employed in the practice of this invention is preferably provided with a drain comprising a continuous slot or opening disposed completely transversely across the bottom of a canal or other discharge means separating a glass melting and refining furnace from a float forming bath.

The following example describes in greater detail the embodiment of this invention, wherein a counter-current flow of tin is established beneath the stream of molten glass on which the ribbon of glass is formed.

EXAMPLE VII

An apparatus such as shown in FIGS. 4 and 5 is operated to produce a ribbon of glass 10 feet wide and about .200 inch thick at a rate of 500 tons per day. Molten tin is recirculated beneath the glass at a rate of about 150 tons per day. In the region between the guides about six feet downstream from the tweel the glass temperature is about 1950° F. in the center of flow and about 1925° F. along the edges; at a location about five feet farther downstream the glass temperature is about 1875° F. in the center of flow and about 1900° F. along the edges; at the ends of the guides the temperature of the glass along the center of flow is about 1680° F. and about 1720° F. along the edges. The glass produced is free of bottom markings and has no extensive angular broken lines of distortion except in the extreme edge portions which must be removed to remove the bulb edge normally formed.

The principles of the present invention will be understood by those skilled in the art to be applicable to situations not specifically described herein. Accordingly, this disclosure is not intended to be limiting, but rather to be illustrative of the invention.

We claim:

1. In the method of manufacturing a continuous sheet of glass comprising the steps of delivering a stream of molten glass onto a pool of molten metal, conveying the glass along the surface of said pool of molten metal, cooling said glass to form a dimensionally stable continuous sheet of glass and withdrawing said continuous sheet of glass from said pool of molten metal whereby the bottom surface of said sheet of glass is characterized by non-homogenous defects, the improvement comprising
   (a) discharging said stream of molten glass across a support such that said stream of molten glass has an upper, exposed surface and a lower surface in contact with said support;
   (b) separating said stream of molten glass on said support into two portions, the first portion including glass in contact with said support and the second portion including glass constituting said exposed surface;
   (c) removing said first portion of molten glass; and
   (d) delivering said second portion of molten glass onto said pool of molten metal, whereby a continuous sheet of glass is formed having a bottom surface characterized as being substantially defect-free.

2. The method according to Claim 1 wherein the steps of separating said stream of molten glass into two portions and of removing said first separated portion are accomplished by providing a drain transverse to the direction of glass flow and by draining molten glass from the bottom of said stream of molten glass.

3. The method according to Claim 2 wherein said first portion of molten glass is from one to five percent of said stream of molten glass.

4. In the method of manufacturing a continuous sheet of glass comprising the steps of delivering a stream of molten glass onto a pool of molten metal, conveying the glass along the surface of said pool of molten metal, cooling said glass to form a dimensionally stable continuous sheet of glass and withdrawing said continuous sheet of glass from said pool of molten metal, the improvement comprising
   (a) flowing said molten metal along a path within said pool of molten metal;
   (b) discharging a portion of said molten metal from said pool of molten metal through a discharge extending transversely across and beneath said stream of molten glass substantially at the location where said molten glass is delievered onto said molten metal;
   (c) separating and removing a minor bottom portion of said molten glass substantially immediately prior to delivering it onto said molten metal; and
   (d) conveying said molten glass in a layer along the surface of said molten metal in a direction substantially counter to the direction of said molten metal flow.

5. The method according to Claim 4 wherein molten metal is added to said pool of molten metal in the vicinity of the location where said continuous sheet of glass is withdrawn from said pool of molten metal.

6. The method according to Claim 4 wherein said molten metal is caused to flow at a higher velocity beneath the center of said conveyed glass than near the marginal portions of said conveyed glass, whereby the rate of heat transfer from the central portion of said conveyed glass to said molten metal is enhanced relative to the rate of heat transfer from the marginal portions of said conveyed glass to said molten metal.

7. In the aparatus for manufacturing a continuous sheet of glass comprising a chamber containining a pool of molten metal in a protective atmosphere, means for delivering a stream of molten glass onto said pool of molten metal, means for conveying said glass along the surface of said pool of molten metal and for withdrawing said continuous sheet of glass therefrom and means for cooling said glass to form a dimensionally stable, continuous sheet of glass, the improvement comprising a drain for separating and removing a minor portion of said stream of glass substantially immediately prior to delivering the remaining major portion onto said pool of molten metal, said drain extending transversely across a bottom, glass supporting portion of said glass delievery means at a location for separating and removing a portion of molten glass that has been in contact with said glass supporting portion.

8. The apparatus according to Claim 7 wherein said apparatus comprises a canal for delivering molten glass to a location from which it falls onto said pool of molten metal and said drain is disposed transversely across the bottom of said canal.

9. The apparatus according to Claim 7 wherein said drain comprises a member for supporting said stream of molten glass having an elongated depression extending transversely substantially across and having at least one drain conduit connected to said depression for carrying away the portion of molten glass entering said depression.

10. In the apparatus for manufacturing a continuous sheet of glass comprising a chamber containing a pool of molten metal in a protective atmosphere, means for delivering a stream of molten glass onto said pool of molten metal, means for conveying said glass along the surface of said pool of molten metal and for withdrawing said continuous sheet of glass therefrom and means for cooling said glass to form a dimensionally stable, continuous sheet of glass, the improvement comprising means for establishing a general flow of molten metal in said pool of molten metal along a path substantially counter to the direction of conveying said glass; means for discharging a portion of molten metal through a discharge extending transversely across a bottom portion of said delievery means; and means for separating and removing a minor bottom portion of molten glass from the molten glass in the vicinity of said molten metal discharge means.

11. The aparatus according to Claim 10 wherein said molten metal discharge means is a drain provided in the vicinity where said molten glass is delivered onto said molten metal, said drain providing means for discharging molten metal from the vicinity of said molten glass; and wherein said apparatus further comprises pumping means for conveying said discharged molten metal to said pool of molten metal at at least one location in close proximity to the location where said continuous sheet of glass is withdrawn from said pool of molten metal.

12. The apparatus according to Claim 11 wherein said pumping means comprises at least one conduit and means for applying electromagnetic forces to said discharged molten metal to cause it to flow through said conduit.

13. The apparatus according to Claim 10 wherein said means for establishing a flow of molten metal comprises means for causing said flowing molten metal to flow at a greater velocity beneath the central portion of said conveyed glass than the velocity of molten metal flow along the marginal portions thereof.

14. The apparatus according to Claim 13 wherein the means for providing a greater central flow velocity comprises means for continuously delivering molten metal to said pool of molten metal at locations on each side of said glass near where said continuous sheet of glass is withdrawn and a centrally disposed drain near where said glass is delievered onto said pool of molten metal, said drain having its outermost drain conduits disposed inwardly from the marginal portions of said flow.

References Cited

UNITED STATES PATENTS

| | | | |
|---|---|---|---|
| 3,248,197 | 4/1966 | Michalik et al. | 65—182 R |
| 3,467,512 | 9/1969 | Loukes et al. | 65—182 R X |
| 3,525,601 | 8/1970 | Ohsato | 65—99 A X |
| 1,609,999 | 12/1926 | Ferngren | 65—196 |

ARTHUR D. KELLOGG, Primary Examiner

U.S. Cl. X.R.

65—99A, 182 R